United States Patent
Phadke

(10) Patent No.: US 7,061,212 B2
(45) Date of Patent: Jun. 13, 2006

(54) CIRCUIT FOR MAINTAINING HOLD-UP TIME WHILE REDUCING BULK CAPACITOR SIZE AND IMPROVING EFFICIENCY IN A POWER SUPPLY

(75) Inventor: Vijay Gangadhar Phadke, Pasig (PH)

(73) Assignee: Astec International Limited, Hong Kong (HK)

( * ) Notice: Subject to any disclaimer, the term of this patent is extended or adjusted under 35 U.S.C. 154(b) by 0 days.

(21) Appl. No.: 10/913,622

(22) Filed: Aug. 6, 2004

(65) Prior Publication Data
US 2005/0030772 A1 Feb. 10, 2005

Related U.S. Application Data

(60) Provisional application No. 60/493,537, filed on Aug. 8, 2003.

(51) Int. Cl.
*G05F 1/656* (2006.01)
*G05F 1/652* (2006.01)

(52) U.S. Cl. .................. 323/222; 323/224; 323/284

(58) Field of Classification Search ............... 323/222, 323/223, 224, 282, 284
See application file for complete search history.

(56) References Cited

U.S. PATENT DOCUMENTS

| 6,504,497 | B1 | 1/2003 | Jang et al. ............ 341/125 |
| 6,512,352 | B1 * | 1/2003 | Qian ................... 323/282 |
| 6,734,655 | B1 * | 5/2004 | Javanifard et al. ....... 323/222 |
| 6,798,177 | B1 * | 9/2004 | Liu et al. ............. 323/222 |

* cited by examiner

*Primary Examiner*—Bao Q. Vu
(74) *Attorney, Agent, or Firm*—Nixon Peabody LLP

(57) ABSTRACT

A circuit that utilizes most of the energy stored in the bulk capacitor of an AC to DC or DC to DC converter power supply by providing an intermediate converter between a first stage boost converter and a DC-DC converter. When the bulk voltage starts to fall during the hold-up time, the intermediate converter boosts the falling voltage to maintain the regulated DC input to the DC to DC converter while reducing the operating range and increasing the operating duty cycle, so as to increase efficiency, reduce peak current and voltage stresses. The circuit also reduces the size of the output filter components and reduces the size of the bulk capacitance by up to half.

18 Claims, 6 Drawing Sheets

US 7,061,212 B2

CIRCUIT FOR MAINTAINING HOLD-UP TIME WHILE REDUCING BULK CAPACITOR SIZE AND IMPROVING EFFICIENCY IN A POWER SUPPLY

RELATED APPLICATIONS

This application claims the priority of U.S. Provisional Application No. 60/493,537, filed on Aug. 8, 2003, entitled "A Circuit for Maintaining Hold-Up Time While Reducing Bulk Capacitor Size and Improving Efficiency in a Power Supply".

FIELD OF INVENTION

The present invention relates in general to power converter circuits and more particularly to a circuit that utilizes a boost converter front end to provide power factor correction.

BACKGROUND OF INVENTION

A conventional AC to DC power converter typically includes a boost converter front end for power factor correction of the input bulk voltage generated from the AC input power source and a downstream DC to DC converter to convert the unregulated bulk voltage into an output voltage that satisfies the voltage regulation and transient response requirements of the power converter. In most applications, there is a "Power Hold-up" requirement for such converters. In other words, the DC output voltage generated by the downstream DC to DC converter is expected to stay in regulation for a predefined amount of time after the input power source has failed. When the input power source fails, a bulk capacitor in the power converter typically provides the necessary temporary power for the downstream DC to DC converter as it discharges. In most AC to DC converters, the minimum hold-up time is required to be the time necessary to maintain voltage regulation for at least one missing AC cycle of the input AC power source. Thus, this hold-up time is typically at least 16 mS for a 60 Hz line frequency AC power source and 20 mS for a 50 Hz line frequency AC power source.

FIG. 1 shows a prior art AC to DC power converter 10 that includes a bulk capacitor C1 for providing the desired hold-up time. The rectified input AC voltage is boosted by a power factor correcting boost converter, comprising an inductor L1, a switch SW1, a diode D1, and a bulk capacitor C1. This boosted bulk voltage across bulk capacitor C1 is input to the DC to DC converter. When the input AC voltage fails, the bulk capacitor C1 starts to discharge and the voltage across it starts to fall. The DC to DC converter responds to this falling voltage by expanding its duty cycle in order to maintain output voltage regulation. At a certain voltage, the duty cycle reaches its maximum limit and output voltage regulation is no longer maintained. This lowest operating voltage point determines how much energy in the bulk capacitor C1 can be utilized for hold-up.

Some power supply topologies, such as a flyback power converter, can operate up to a very wide duty cycle, with certain penalties on performance. Other topologies, such as the forward converter, cannot operate over a very wide duty cycle since, for very wide duty cycle variations, the efficiency drops significantly due to high peak currents. This significant drop in efficiency limits the practical input voltage tolerance of the DC to DC converter. As a result, for forward converters and other topologies that cannot operate over a very wide duty cycle, only a limited amount of energy stored in the bulk capacitor C1 is utilized during a power failure mode. For example, most DC to DC converters operate in the range of 100% of the normal bulk voltage level down to 75% if this level. Thus, for higher power, it is necessary to increase the size of the bulk capacitor to meet the hold-up requirement. This results in inefficient use of the available space in the power supply, affecting the power density.

As an example, a typical power factor corrected, 3 KW power supply receiving input power from a standard AC outlet and configured as in FIG. 1 will include a hard-switched power factor corrected boost converter front end and a zero voltage switching (ZVS) full bridge converter for the downstream DC to DC converter. A typical value for a bulk capacitor C1 is 2350 uF and is comprised of 5 electrolytic capacitors of 470 uF each. Typical efficiencies of 88% are obtained for such converters.

In modern AC to DC and DC to DC power supplies, the requirement of higher power density is increasing day by day. Higher power converter switching frequencies reduce the sizes of the magnetic components significantly. Improvement in efficiency is also obtained by using better and faster semiconductor devices and more efficient topologies, which enables the size of the associated heat sinks to be reduced. However, the size of the bulk capacitor still remains the same, and this severely restricts advancements in higher power density. A circuit is therefore needed that will enable use of most of the energy stored in the bulk capacitance, to thereby reduce bulk capacitor requirements while also improving the efficiency of the converter.

FIG. 2 shows another prior art AC to DC power converter 20 having three stages of power conversion, including a second stage buck converter between a front-end boost converter and a downstream DC to DC converter. The second stage buck converter comprises a switch SW2, a diode D3, an inductor L2, and a capacitor C2. The buck converter operates to step down the bulk voltage on the bulk capacitor C1 to a much lower value. Thus, the buck converter provides the downstream DC to DC converter with a well-regulated input voltage across capacitor C2. Upon failure of the line input AC voltage, bulk capacitor C1 starts to discharge, but the voltage across capacitor C2 is kept constant due to the wider regulation range of the second stage buck converter. For example, if the voltage across capacitor C2 is regulated to 0.5 Vb, where Vb is the nominal bulk voltage across C1, the energy utilization during the hold-up time is improved considerably. Consequently, either a smaller bulk capacitor can be used or the hold-up time increased if the same sized bulk capacitor is used.

A drawback of power converter 20 in FIG. 2 is that the additional buck converter operates continuously and dissipates power. As a result, for power converter 20, the improved efficiency of the downstream DC to DC converter due to the narrow input voltage range is more than offset by the additional dissipation in the buck converter.

For example, a typical power factor corrected, 3 KW power supply receiving input power from a standard AC outlet and using the topology shown in FIG. 2 would typically need a bulk capacitor C1 of 470 uF×3, a capacitor C2 of 470 uF, for a total capacitance of C1+C2=1880 uF. Typical efficiencies of 87.5% are obtained with such converters. Moreover, as the buck converter must operate at a duty cycle close to 50%, e.g. bucking the voltage from 400V to 200V, in order to enable a reduced bulk capacitor to be used, a large value is required for inductor L2 and capacitor C2.

FIG. 3 shows another prior art AC to DC power converter 30 that includes a bulk capacitor C2 for providing the desired hold-up time. Power converter 30 includes a power factor correction (PFC) boost front end converter having an inductor L1, a switch SW1, a diode D1, and a bulk capacitor C1. Power converter 30 generates a boosted bulk voltage across a capacitor C1, and at the same time, charges an energy storage capacitor C2 through a diode D2. As seen in FIG. 3, a second boost converter, identified as an auxiliary boost converter, includes an inductor L2, a switch SW2, and a diode D4 as boosting elements. The control loop of the second boost converter is set at a much lower voltage regulation point than that of first boost converter stage. Typically, this voltage regulation point is set at a level that is marginally higher than the regulation break voltage point of a conventional DC to DC converter. For example, if the nominal bulk voltage is Vb and the regulation break voltage point of the conventional DC to DC converter is 0.75Vb, the voltage regulation point of the second boost converter is set at around 0.8Vb. As a result, in normal operation, the second boost converter stage is always off and does not generate any power dissipation. Upon failure of the AC input, bulk capacitor C1 in power converter 30 continues to discharge while providing hold-up power to the DC to DC converter. When the voltage across bulk capacitor C1 falls to 0.8Vb in this example, the second boost converter starts to regulate using the energy from storage capacitor C2. Since this second boost converter stage can operate up to a very wide duty cycle, it can regulate the voltage across bulk capacitor C1 until most of the energy in storage capacitor C2 is utilized. Thus, power converter 30 provides an extended hold-up time while reducing the bulk capacitor size. Power converter 30 does, however, have several drawbacks as are illustrated with reference to FIGS. 3 and 4.

FIG. 4 is a timing diagram for power converter 30 in FIG. 3 that illustrates the operation of converter 30 in more detail, where Vb is shown as Vbulk. As seen in FIG. 3, power converter 30 requires two sets of capacitors, bulk capacitor C1 for normal operation filtering and hold-up and capacitor C2 for energy storage during an extended hold-up period. Despite the inclusion of a diode D3 between capacitor C1 and capacitor C2 in power converter 30, in normal operation capacitor C1 and capacitor C2 do not share the power handling equally. During normal operation, since capacitors C1 and C2 are both charged to an equal voltage level, diode D3 adds an extra voltage drop in the path of capacitor C2, and thus power converter 30 functions less efficiently. During hold-up, capacitor C2 will operate with capacitor C1 well, since the rate of discharge of capacitor C1 is high and capacitor C2 effectively becomes parallel to capacitor C1 when it is discharging. As a result, for power converter 30, capacitor C1 still must be sized to handle most of the ripple current of the first boost converter stage. The ripple is typically twice the line frequency, i.e., 100 Hz for a 50 Hz AC source line frequency and 120 Hz for a 60 Hz AC source. The ripple current rating and operating life parameters for the converter set the minimum possible size of capacitor C1 in power converter 30.

Another drawback of power converter 30 is that it requires an extra storage capacitor C2 which must be large enough to store enough energy to provide the required additional hold-up time. Still another drawback of power converter 30 is that it does not reduce the operational range of the DC to DC converter less than for other prior art converters. As a result, power converter 30 does not provide any performance gain over prior art converters.

For example, a typical power factor corrected, 3 KW power supply receiving input power from a standard AC outlet and configured as shown in FIG. 3 would typically need a bulk capacitor C1 of 470 uF×3, a capacitor C2 of 470 uF, resulting in a total capacitance of C1+C2=1880 uF. Typical efficiencies of 88% are attained with such converters. Thus, the efficiency of power converter 30 is not improved over that for the power converters in FIGS. 1 and 2 since the operating range of the DC to DC converter shown in FIG. 3 is not changed.

FIG. 5 shows a circuit diagram for a prior art AC-DC power converter 40 that provides line harmonic correction. Power converter 40 comprises a power factor corrected flyback converter that switches directly on the rectified AC input pulses. AC input power is applied at two input terminals and is conventionally used to produce unsmoothed DC through the use of a conventional bridge rectifier having two output terminals. A capacitor C1 is connected in series with a diode D2 across the terminals of the bridge rectifier. Power converter 100 includes a transformer T1 having a primary winding, a secondary winding, and an auxiliary winding, each having a first and a second end. In power converter 40, the auxiliary winding provides the energy for recharging the capacitor C1 during each flyback cycle of the flyback converter 40. The primary winding of transformer T1 in FIG. 5 is conventionally switched on and off at a predetermined frequency by means of a first switch SW1. The control signal input to switch SW1 is typically a conventional pulse width modulation (PWM) or power factor correction (PFC) type drive signal (details not shown). The secondary winding of transformer T1 is connected to a rectifying and filter circuit comprising a diode D3 and a capacitor C2, to produce the rated DC output voltage.

The charging of capacitor C1 in power converter 40 to a predetermined voltage is controlled by the circuit comprising the auxiliary winding, and a resistor R1 connected in series with a second switch SW2 and a diode D1 between one end of the auxiliary winding and one terminal of capacitor C1. The other terminal of capacitor C1 is connected to the second end of the auxiliary winding.

In operation, when switch SW1 of converter 40 closes, current flows in the primary of the transformer T1 and energy is stored therein. When the switch SW1 is opened, during the flyback period of converter 40, the polarity on the transformer T1 windings changes and the secondary rectifier diode D3 becomes forward biased. Diode D3 delivers power to a load as connected at the output terminals and stores energy in output capacitor C2. During this flyback period when switch SW1 is open, switch SW2 is turned on and capacitor C1 is charged to a predetermined voltage determined by the turns ratio between the primary winding and the auxiliary winding.

Thus, switch SW2 turns on only during the flyback period of converter 40. The voltage on capacitor C1 is usually selected low (around 50V or so). In normal operation, when the instantaneous voltage of the rectified AC pulse is higher than the voltage at which capacitor C1 is charged, diode D2 is reverse biased. Capacitor C1 will continue to hold its charge during this time. When this instantaneous voltage falls below the capacitor C1 voltage near the "valley point" of the rectified AC pulse, diode D2 becomes forward biased. As a result, capacitor C1 provides energy to transformer T1 to continue operation during this time. Capacitor C1 thus provides hold-up time during this period. Switch SW2 can also be held off when the charge on capacitor C1 is being used by converter 40 in order to reduce the peak currents in the transformer T1.

One drawback of the circuit in FIG. 5 is that capacitor C1 fails to provide the larger hold-up time required in most applications. If capacitor C1 is to provide a large hold-up time, then a large capacitor will be needed, since the voltage charge on capacitor C1 is very close to the voltage that exists at the bottom of the rectified pulse. As a result, there is poor energy utilization in this example.

The circuit in FIG. 5 can be improved using an extra boost conversion stage as taught in FIG. 1 in such a way that it extends the hold-up time of the converter 40, while reducing the bulk capacitor size. The additional stage would also improve the efficiency of the downstream DC to DC converter, while reducing the size of its output filter components. However, such a circuit would still have the drawbacks described above with respect to converter 10.

A circuit is therefore needed that will enable use of most of the energy stored in the bulk capacitor to thereby reduce bulk capacitor size requirements, while also improving efficiency.

SUMMARY OF THE INVENTION

The present invention discloses a three-stage power converter that comprises a first boost converter stage having a bulk capacitor, a second boost converter stage, and a third DC to DC converter stage. The second boost converter stage is provided between the other two stages. The second boost converter stage provides a boosted voltage across a second capacitor when the voltage across the bulk capacitor is below a predetermined voltage level, thereby causing the voltage on the second boost converter output to be regulated at the predetermined voltage level. The second boost converter stage is turned off most of the time during normal operation through a diode in the second boost converter stage for extending the hold-up time while reducing the size of the capacitor in the second boost converter stage. This is accomplished by setting the voltage regulation point of the second boost converter stage to a valley point of a low frequency ripple on a bulk voltage delivered by the bulk capacitor in the first booster stage given that the second stage would detect an over-voltage on the output. When the bulk voltage in the bulk capacitor falls lower in the valley, due to low frequency ripple, the second boost stage will become active and will maintain the voltage level flat in the valley due to the fast control loop in the second boost converter stage. In operation, when the bulk voltage starts to fall during the hold-up time, the second boost converter or an intermediate converter boosts the falling voltage to maintain the DC input to the DC to DC converter between a narrow operating range and increases the operating duty cycle, so as to increase efficiency, reduce peak current and voltage stresses, reduce the size of output filter components and reduce the size of the bulk capacitance by up to half.

The present invention solves the problem of bulk capacitor size and power efficiency in a power converter by providing a circuit that more efficiently enables a significantly larger amount of the energy stored in the bulk capacitor to be used whenever there has been an input power failure. As a result, a much smaller bulk capacitor can be used to obtain the same hold-up time for the voltage output by the converter, while achieving increased efficiency. Alternatively, a much larger hold-up time can be attained for the same sized bulk capacitor.

An advantage of the inventive circuit is that it enables the converter to switch at a very high duty cycle, and thereby keep on delivering power to the converter's output terminals until the bulk capacitor has discharged to a very low level.

Another advantage of the present invention is that it improves the efficiency of the DC to DC converter by reducing its input voltage operating range.

Another advantage of the present invention is that it reduces the peak current and voltage stresses on the DC to DC converter components.

Another advantage of the present invention is that it reduces the size of the output filter components because of a higher steady state duty cycle.

BRIEF DESCRIPTION OF THE DRAWINGS

The foregoing aspects and the attendant advantages of the present invention will become more readily appreciated by reference to the following detailed description, when taken in conjunction with the accompanying drawings, wherein.

DETAILED DESCRIPTION OF THE INVENTION

Figure 6:
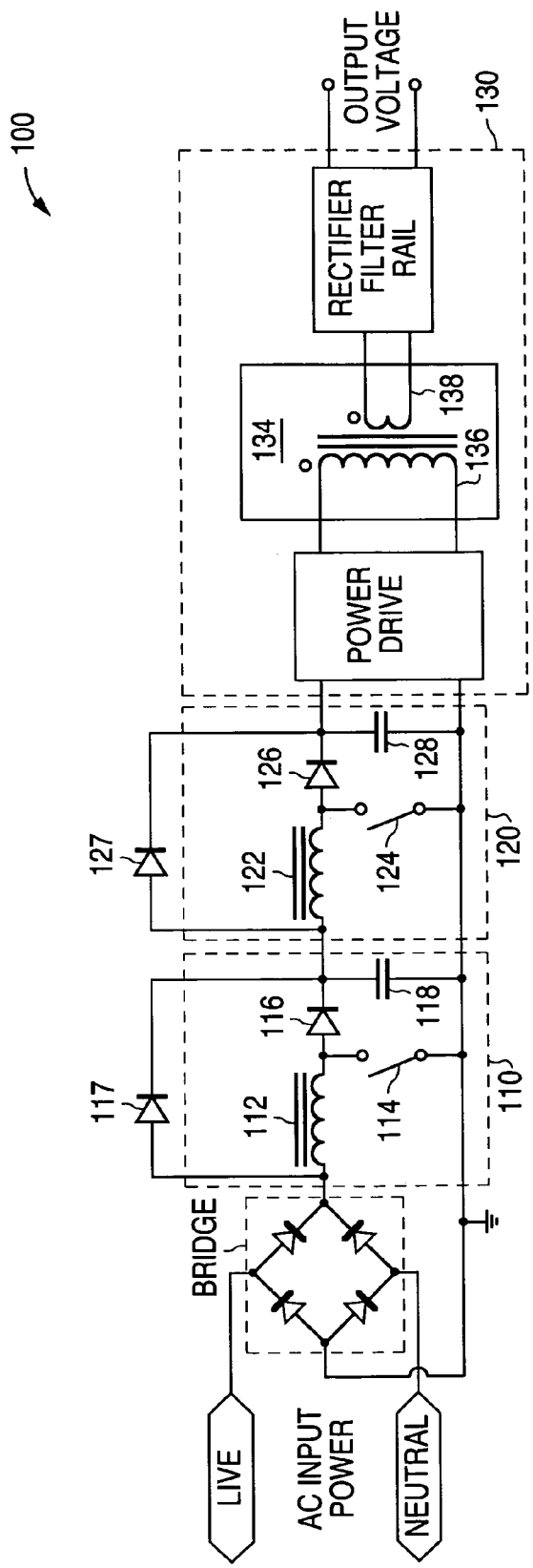
FIG. 6 is a preferred embodiment of the circuit according to present invention for enabling the size of a power converter's bulk capacitor to be reduced while providing improved efficiency.

A preferred embodiment of a circuit according to the present invention is shown at 100 in FIG. 6. Converter 100 includes a first stage boost converter 110, a downstream DC to DC converter 130, and a second stage converter 120 inserted between the first stage boost converter 110 and the DC to DC converter 130. A rectified input AC voltage is boosted by the first stage boost converter 110, comprising an inductor 112, a switch 114, a diode 116, and a bulk capacitor 118. The first stage boost converter 110 provides a boosted bulk voltage across capacitor 118. The second stage converter 120 of converter 100 is preferably a boost converter comprising an inductor 122, a switch 124, a diode 126, and a decoupling capacitor 128. As shown in FIG. 6, the DC to DC converter 130 is coupled between the output and the second stage boost converter 120. The downstream DC to DC converter 130 includes a conventional power drive circuit coupled between the second stage boost converter 120 and the primary winding 136 of a transformer 134. The secondary winding 138 of transformer 134 is connected to a conventional rectifier filter rail circuit to produce the rated DC output voltage.

Power converter 100 includes a diode 117 and diode 127. Diode 117 is connected in parallel with the series combination of inductor 112 and diode 116 of the first stage boost converter 110. Diode 117 functions only during an inrush current condition that occurs when the power supply turns on, in order to avoid saturating inductor 112 at startup. Diode 127 is a bypass diode connected in parallel with the series combination of inductor 122 and diode 126 of the second stage converter 120. It functions to bypass the second stage converter 120 when the converter 120 is not operating.

In operation, after the input AC voltage fails, the bulk capacitor 118 starts to discharge and the voltage across it starts to fall. The control signal input to switch 114 is typically a conventional PWM or PFC type drive signal (details not shown). Preferably, the first stage boost converter 110 is PFC controlled. The output DC voltage across capacitor 118 typically exhibits a low frequency ripple due to the slow control loop of the first stage boost converter 110, which is designed to sense voltage and current variation of an AC input line frequency of typically 50 Hz or 60 Hz and ignore the twice line frequency ripple. According to the present invention, a much smaller bulk capacitor can be used to obtain the same hold-up time for the voltage output by the converter. As a result, the bulk voltage on 118 has a considerable amount of low frequency ripple at higher loads.

Figure 7:
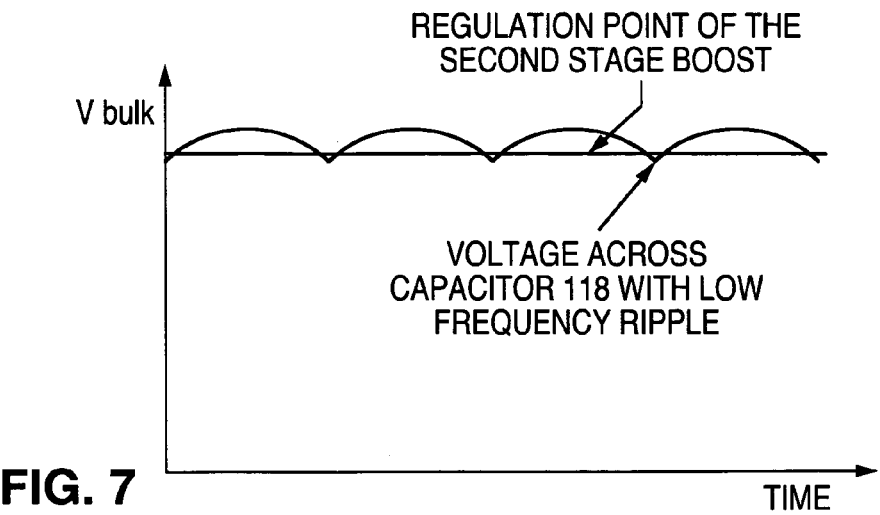
FIG. 7 is a timing diagram illustrating the regulation point of the second stage boost converter for the circuit embodiment shown in FIG. 6.

As shown in FIG. 7, the voltage regulation point of the second stage boost converter 120 is preferably set in the valley point of the low frequency ripple on the bulk voltage delivered by capacitor 118. Thus, for most of the time during normal operation, the second stage boost converter 120 is turned off by its control loop since it sees an overvoltage on its output. Diode 127 provides a bypass current path when the second stage boost converter 120 is not operating.

Figure 8:
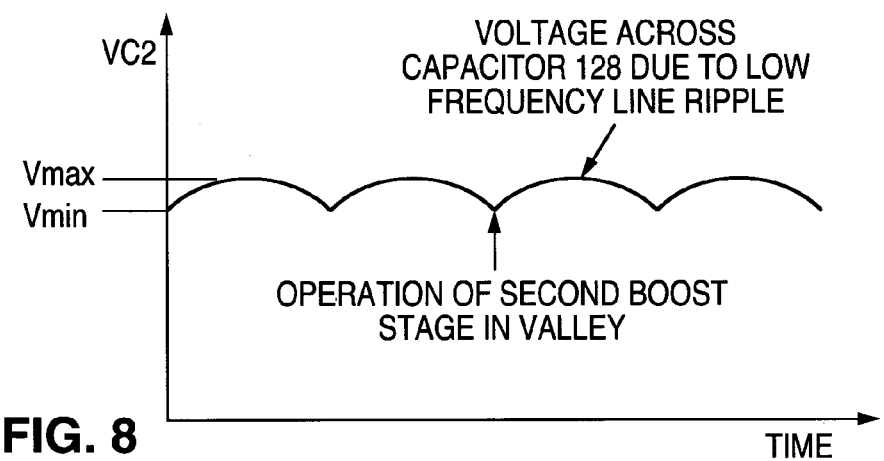
FIG. 8 is a timing diagram showing the voltage across the capacitor of the second stage converter in the circuit shown in FIG. 6.

When the bulk voltage falls lower in the valley, due to low frequency ripple, the second stage boost converter 120 will become active and will maintain the voltage level flat in the valley due to its fast control loop. The resultant voltage across capacitor 128, which provides power to the downstream DC to DC converter stage 130, is shown in FIG. 8. As shown, the voltage across capacitor 128 provided to the downstream DC to DC converter 130 always stays within a narrow band bounded by Vmax and Vmin.

If the first stage boost converter 110 is subjected to step loads or line transients at the input, the voltage on the bulk capacitor 118 can see an overvoltage. During such short instances, the duty cycle of the DC to DC converter 130 can shrink and then recover. For normal operation, however, the input voltage span is quite narrow, thus, the DC to DC converter 130 can operate at close to its maximum duty cycle, thereby reducing peak current and voltage stresses. As a result, the present invention enables the size of the components of the conventional output rectifier filter rail (details not shown) to be reduced.

Thus, the circuit shown in FIG. 6 uses only one bulk capacitance 118 which is rated to handle the required ripple current stress in worst case normal operation, while storing sufficient energy to provide the required hold-up time interval. Since the second stage converter 120 has a very fast loop, the value for capacitor 128 can be very small. Due to very low duty cycle for switch 124, the ripple current stress on capacitor 128 is very small. As a result, capacitor 128 can be a small electrolytic capacitor or even a ceramic/plastic film capacitor.

Figure 1:
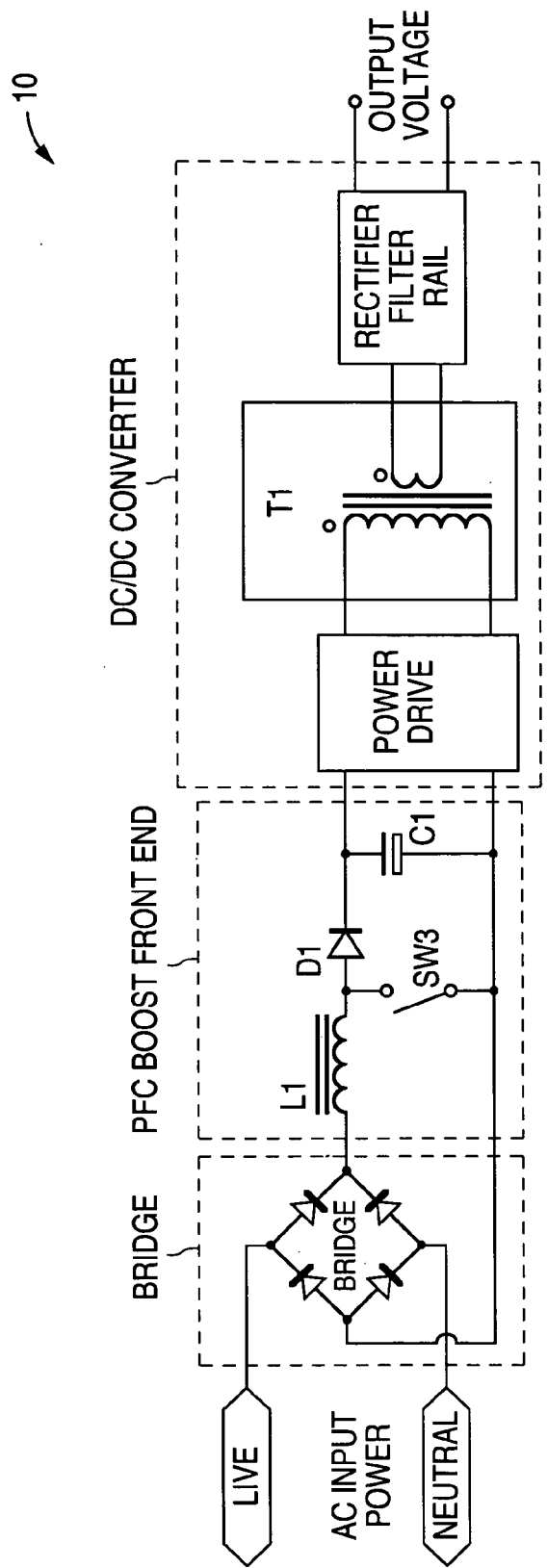
FIG. 1 is a schematic of a prior art AC to DC power converter that includes a bulk capacitor for providing a hold-up time.
Figure 2:
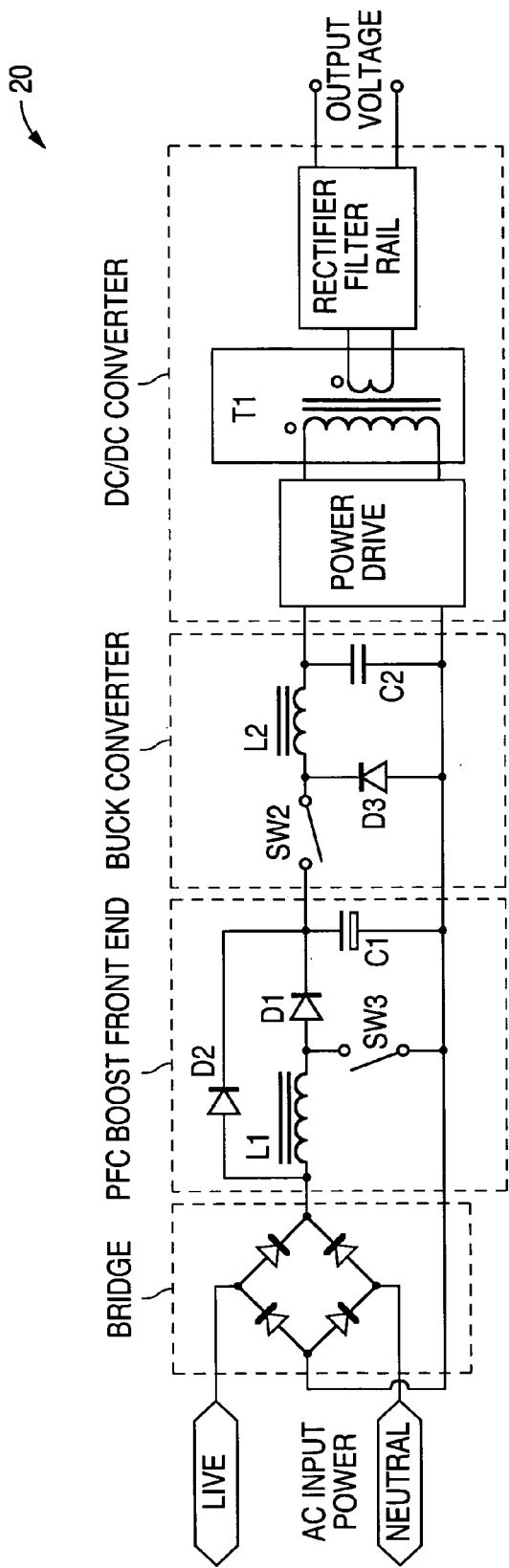
FIG. 2 shows a prior art AC to DC power converter having three stage conversion including a second stage buck converter between a front-end boost converter and a DC to DC converter.

For example, an exemplary power factor corrected, 3KW power supply, receiving input power from a standard AC outlet, as shown in FIG. 6, preferably including a hard-switched PFC first stage boost converter 110 and a ZVS full bridge converter for the DC to DC converter 130, will provide the same amount of hold-up time with a bulk capacitor 118 of 470 uF×3, a capacitor 128 of 2.2 uF, i.e., C1+C2=1412.2 uF. Thus, there is a reduction in capacitance of capacitors 118 and 128 of approx. 40% for the present invention as compared to the exemplary values for FIG. 1 (2350 uF, as given above), and approx. 25% as compared to the exemplary values for FIGS. 2 and 3 (1880 uF, as given above). This exemplary circuit in FIG. 6 has a typical efficiency of 88.8%. Thus, the circuit shown in FIG. 6 enables the DC to DC converter 130 to operate over a narrow range, thereby increasing efficiency 0.8% for the exemplary circuit as compared to the highest efficiency obtained with the prior art converters shown in FIGS. 1, 2, 3, and 5.

As described, modern AC to DC and DC to DC power supplies require ever increasing power density, thereby requiring increasingly higher switching frequencies in order to reduce the size of the components. Since the second stage boost converter 120, shown in FIG. 6 comprised of inductor 122, switch 124, and diode 126, operates only during the hold-up time, experiments conducted by the inventor demonstrated that if the switching frequency is high enough, e.g., 300 kHz used experimentally, a small value of capacitor 128 is sufficient.

Figure 3:
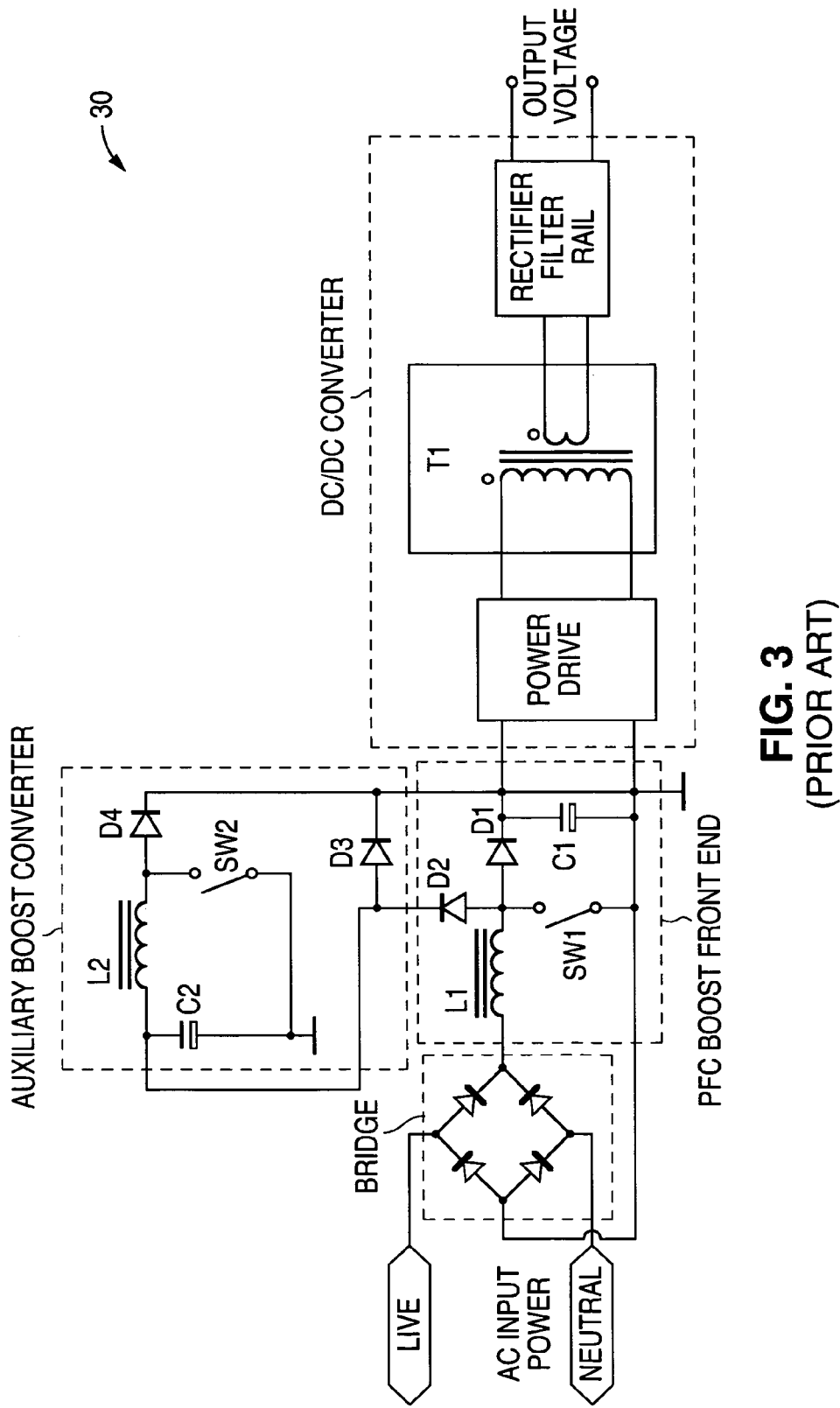
FIG. 3 shows a prior art AC to DC power converter which includes a bulk capacitor for providing a hold-up time and which further includes a standby boost converter stage.
Figure 4:
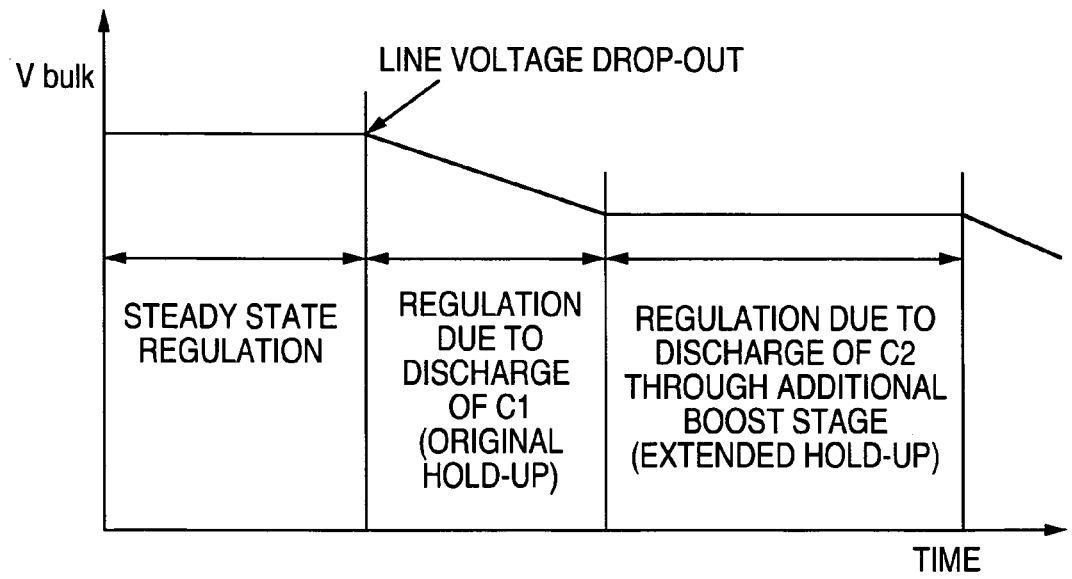
FIG. 4 is a timing diagram that illustrates the operation of the power converter 30 of FIG. 3.
Figure 5:
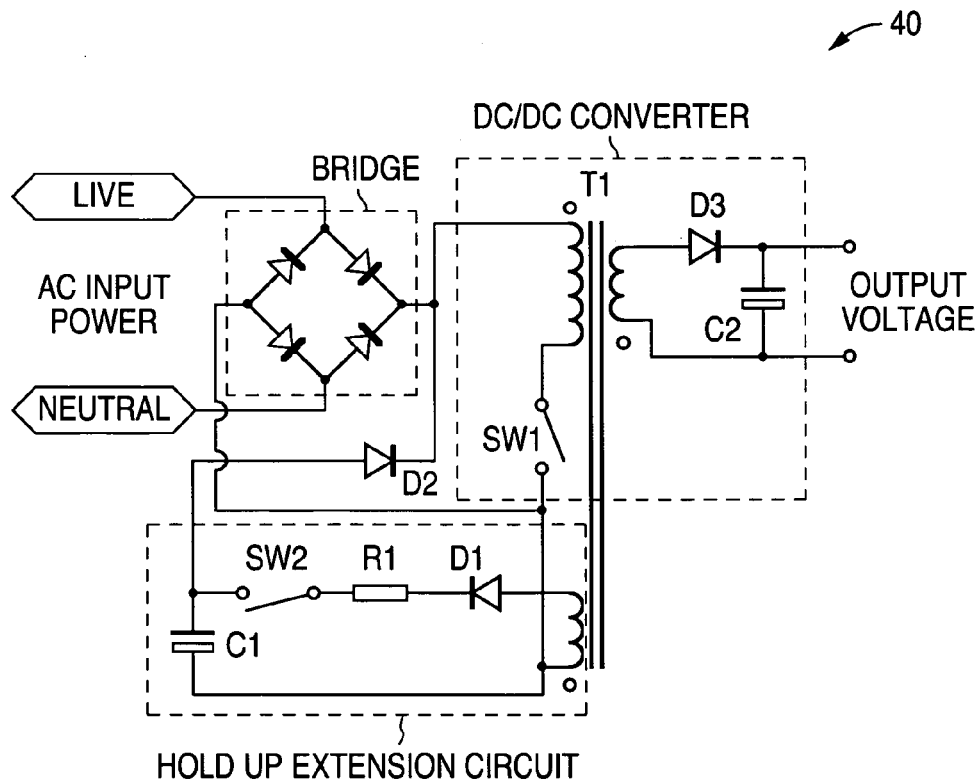
FIG. 5 shows a circuit diagram for a prior art flyback converter that provides line harmonic correction and includes a capacitor that provides some hold-up time.
Figure 9:
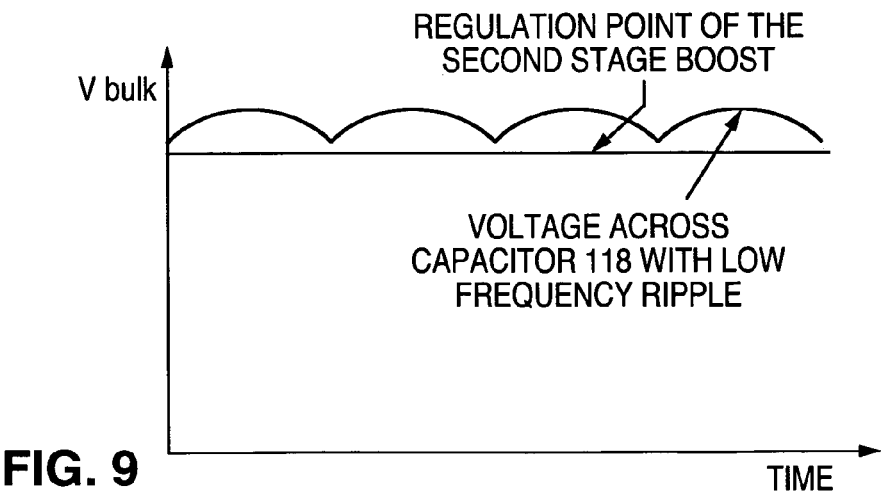
FIG. 9 is a timing diagram illustrating the voltage across the bulk capacitor and the regulation point of the second stage boost converter for the circuit shown in FIG. 6 where the voltage regulation point of the second boost stage is set slightly below the lowest valley point of the line frequency ripple such that it will always be inactive in normal operation.

For the preferred embodiment of the inventive circuit shown in FIG. 6, the voltage regulation point of the second stage boost converter may alternatively be set slightly below the lowest valley point of the line frequency ripple, such that the second stage boost converter is always inactive in normal operation. This mode of operation is illustrated in the timing diagram shown in FIG. 9. For this alternative "standby" mode of operation, the second stage boost converter 120 starts to regulate only after the AC input fails and the bulk voltage across capacitor 118 drops to the regulation point of the second stage boost converter 120. A difference between this alternative mode of operation and the operation of the circuit in FIG. 3 is that the circuit in FIG. 6 requires only one bulk capacitance 118 instead of the two energy storage capacitors required by the circuit shown in FIG. 3. Although another capacitor, 128, is required in the circuit in FIG. 6, the second stage converter 120 requires only a very small electrolytic capacitor or even a very small ceramic/plastic film capacitor for 128 for decoupling. In the example given above, the value of capacitor 128 is 2.2 uF, which is substantially below the 470 uF value for the energy storage capacitor C2 that is used in the circuits in FIGS. 2 and FIG. 3, as described above. Thus, the circuit shown in FIG. 6 reduces the bulk capacitance size, saves valuable space in a high power density power supply, and reducing cost significantly, while increasing efficiency.

The mode of operation for the present invention that works best depends on the requirements of a particular application. Typical requirements are minimizing power loss, minimizing bulk capacitor size, or maximizing the hold-up time, or a combination thereof.

The second stage boost converter shown in the embodiment in FIG. 6 is preferably a discontinuous mode design. Alternatively, a suitable continuous inductor current design may be used. For an embodiment having a discontinuous inductor current converter for the second stage boost converter 120, a low cost, fast recovery diode could be used for diode 126. In the mode of operation wherein the second boost stage switching occurs only in the valley of low frequency ripple, as illustrated in FIG. 7, the losses for such conversion would be very low. Due to very low RMS and peak currents, switch 124, inductor 122, and diode 126 in the second stage boost converter 120 could be very small.

As described, the present invention provides the required hold-up time while reducing the bulk capacitance and improving the efficiency of the DC to DC conversion.

For applications wherein a practical limitation such as ripple current rating, etc., does not allow the reduction of bulk capacitor size, the present invention provides the advantage of reducing the size of the output filter components, transformers, rectifiers, etc.

The present invention could be used in any power supply which uses a first stage boost converter. For the present invention, the second stage converter 120 is not limited to a boost converter topology. For example, in place of the second stage boost converter 120, a buck-boost converter could be used in such a way that it normally bucks down the output voltage of the first stage boost converter to a lower value. Thus, this alternative second stage provides a regulated, narrow band DC voltage to the downstream DC to DC converter 130. When the bulk voltage starts to fall during the hold-up time, this alternative circuit can switch and become a boost converter to boost the falling voltage and maintain the regulated DC input to the DC to DC converter 130.

Having disclosed exemplary embodiments, modifications and variations may be made to the disclosed embodiments while remaining within the scope of the invention as described by the following claims.

I claim:

1. A power converter having an input and an output, comprising in combination:
    a first boost converter having an input for receiving an input voltage, an output, a first switch, and a bulk capacitor, said first boost converter for providing a boosted bulk voltage across said bulk capacitor;
    a second boost converter having an input coupled to the output of said first boost converter and having an output, a second switch, and a second capacitor connected across said output of said second boost converter, said second boost converter for providing a boosted voltage across said second capacitor when the voltage across said bulk capacitor is below a predetermined voltage level so as to cause the voltage on said output of said second boost converter to be regulated at said predetermined voltage level; and
    a first diode connected so as to bypass said second boost converter when said second boost converter is not operating so as to couple the voltage generated by said first boost converter to said output of said power converter.

2. The power converter of claim 1, wherein said predetermined voltage level comprises a voltage at a selected valley point of a voltage ripple on said bulk capacitor voltage when said first boost converter is in normal operation.

3. The power converter of claim 1, wherein said predetermined voltage level comprises a voltage below said boosted bulk voltage.

4. The power converter of claim 1, wherein said bulk capacitor in said first boost converter is selected to handle a predetermined ripple current stress while storing sufficient energy to provide a predetermined hold-up time-interval.

5. The power converter of claim 1, wherein said second capacitor in said second boost converter is selected to be a small capacitor value relative to said bulk capacitor in said first boost converter.

6. The power converter of claim 1, wherein said second capacitor in said second boost converter comprises a small electrolytic capacitor.

7. The power converter of claim 1, wherein said second capacitor in said second boost converter comprises a ceramic film capacitor.

8. The power converter of claim 1, wherein said second capacitor in said second boost converter comprises a plastic film capacitor.

9. The power converter of claim 1, further comprising a bridge rectifier connected to a pair of AC input terminals for generating a rectified AC voltage from a source of AC power said bridge rectifier having an output connected to said input of said first boost converter so as to provide said input voltage to said first boost converter.

10. The power converter of claim 1, wherein said first boost converter comprises:
    a first inductor having a first terminal connected to the bridge rectifier and a second terminal;
    a second diode having a first terminal and a second terminal, the first switch having a first terminal and a second terminal, the bulk capacitor having a first terminal and a second terminal, the first terminal of the second diode connected commonly to the second terminal of the first inductor and the first terminal of the first switch, the second terminal of the second diode connected to the first terminal of the bulk capacitor; and
    a third diode having a first terminal and a second terminal, the first terminal of the third diode connected to the first terminal of the first inductor and the output of the bridge rectifier, the second terminal of the third diode connected to the second terminal of the first diode and the first terminal of the bulk capacitor, the third diode for providing a bypass of said first boost converter during an inrush current condition at startup of said power converter.

11. The converter of claim 10, wherein said second boost converter comprises:
    a second inductor having a first terminal and a second terminal, the first terminal of the second inductor connected to the output of said first boost converter;
    a fourth diode having a first terminal and a second terminal, the second switch having a first terminal and a second terminal, the first terminal of the fourth diode connected commonly to the second terminal of the second inductor and the first terminal of the second switch;
    the first diode having a first terminal and a second terminal, the first terminal of the first diode connected commonly to the second terminal of the third diode, the second terminal of the second diode and the first terminal of said bulk capacitor; and
    the second capacitor having a first terminal and a second terminal, the first terminal of the second capacitor connected commonly to the second terminal of the fourth diode and the second terminal of the first diode;
    wherein the second inductor, the switch, and the fourth diode in said second boost converter operate during a hold-up time.

12. The converter of claim 11, wherein the DC to DC converter comprises:

a power drive circuit having two input terminals and two output terminals, the second capacitor connected across the input terminals;

a transformer having a primary winding coupled to the power drive circuit and a secondary winding; and a rectifier filter rail circuit coupled to the secondary winding of the transformer.

13. The converter of claim 1, wherein the DC to DC converter comprises a ZVS full bridge converter.

14. The converter of claim 1, wherein the first switch receives a pulse width modulation signal.

15. The converter of claim 1, wherein the first switch receives a power factor correction type drive signal.

16. An AC to DC power converter having three stages of DC to DC conversion, two AC input terminals to which a source of AC power is coupled, and two output terminals where the output DC power is provided, comprising:

a first boost converter having first and second DC input terminals to which a rectified AC voltage is coupled, comprising a first switch, a first inductor, a first diode, and a bulk capacitor, said first switch connected between the junction of said first inductor and first diode and the second DC input terminal;

a DC to DC converter whose output is coupled to said two output terminals where the output DC power is provided, comprising a transformer having a primary winding and a secondary winding, a power drive circuit connected to said primary winding, said secondary winding connected to an output filter to produce the rated DC output voltage;

a second boost converter coupled between said first boost converter and said DC to DC converter comprising a second switch, a second inductor, a second diode and a second capacitor, said second switch connected between the junction of said second inductor and second diode and the second DC input terminal, said second switch is alternately switched on and off as a function of a control signal, said second capacitor is connected across the output of said second boost converter, wherein said second switch is switched on when the voltage on the bulk capacitor falls to the valley point of the low frequency ripple of the bulk voltage, so as to maintain the voltage level flat at the valley point;

a third diode connected in parallel across the series combination of said first inductor and said first diode, and a fourth diode connected in parallel across the series combination of said second inductor and said second diode, said fourth diode providing a current path when said second boost converter is off.

17. The AC to DC power converter of claim 16, further comprising a bridge rectifier connected to said AC input terminals for generating the rectified AC voltage from said source of AC power.

18. The converter of claim 1, further comprising a DC to DC converter having an input coupled to the output of said second boost converter and having an output, the DC to DC converter generating a rated DC voltage at said DC to DC converter output.

* * * * *